United States Patent [19]

Schleicher et al.

[11] Patent Number: 5,315,787
[45] Date of Patent: May 31, 1994

[54] APPARATUS FOR AUTOMATIC FEEDING OF CONTAINER PLANTS

[76] Inventors: Israel D. Schleicher, 10901 Bahia Ct., Bakersfield, Calif. 93311; Yaacov Schleicher, 2701 S. Fairview St. #P-3, Santa Ana, Calif. 92704

[21] Appl. No.: 924,158
[22] Filed: Aug. 3, 1992
[51] Int. Cl.$^5$ ............................................. A01G 25/00
[52] U.S. Cl. ........................................ 47/79; 47/48.5; 222/66
[58] Field of Search ................ 47/79, 48.5, 40.5; 222/66

[56] References Cited

U.S. PATENT DOCUMENTS

| | | | |
|---|---|---|---|
| 2,031,146 | 2/1936 | Dodge | 47/38 |
| 2,611,643 | 9/1952 | Higgins | 299/25 |
| 2,784,876 | 3/1957 | Parkes | 222/66 |
| 3,293,799 | 12/1966 | Keller et al. | 47/38 |
| 3,438,575 | 4/1969 | Rohling | 239/1 |
| 3,512,712 | 5/1970 | Benesch | 239/63 |
| 3,529,749 | 9/1970 | Lehmann | 222/66 |
| 3,590,335 | 6/1971 | Tetar | 317/148.5 |
| 3,892,982 | 7/1975 | Holmes | 307/118 |
| 4,186,849 | 2/1980 | Spangler | 222/66 |
| 4,843,758 | 7/1989 | Raczkowski | 47/48.5 |
| 4,937,972 | 7/1990 | Freitus | 47/62 |
| 4,961,285 | 9/1990 | Jenkins et al. | 47/79 |
| 5,097,626 | 3/1992 | Mordoch | 47/48.5 G |

FOREIGN PATENT DOCUMENTS 2180939 4/1987 United Kingdom ................ 222/66

OTHER PUBLICATIONS

Home & Garden (vol. 58), Feb. 1971, p. 12 "Editors' Tests".
Sunset (vol. 182), Feb. 1989, p.183 "Pots that water themselves?".

Primary Examiner—Henry E. Raduazo

[57] ABSTRACT

An add-on apparatus for feeding container plants. The apparatus contains a battery-powered pump which is designed to pump feeding solution out of a user-supplied container. The apparatus also contains a moisture sensor which is embedded by the user in the growth medium of the plant. This sensor controls the operation of the pump. On the condition of low moisture level, indicative of the need to feed, the pump operates for a controlled duration thus delivering a controlled amount of feeding solution to the plant.

2 Claims, 3 Drawing Sheets

APPARATUS FOR AUTOMATIC FEEDING OF CONTAINER PLANTS

FIELD OF INVENTION

This invention relates to the field of plant culture. In particular to plant receptacles with irrigators.

BACKGROUND AND PRIOR ART

Plants growing in containers require frequent watering at varying time intervals, the duration of which depends on the rate of absorption and evaporation. Special containers are commercially available which provide moisture for a prolonged time and reduce the need for frequent watering. This type of containers are comprised of two compartments, one contains a growth medium that supports the plant and the other contains water or a water solution of fertilizer. Solution from the latter compartment is drawn into the growth medium of the first compartment by the capillary action of a wick which is made in contact with both the solution and the growth medium. Alternatively, in a similar type the two compartments are constructed to share a common wall, part or all of this common wall is made of a porous material that allows a slow flow of solution from the compartment that contains it into the compartment sustaining the plant.

In the continued discussion references are made to the following sources and U.S. patents:
SUNSET magazine (vol.182) page 183, February 1989.
U.S. Pat. No. 2,031,146: Dodge
U.S. Pat. No. 2,611,643: Higgins
U.S. Pat. No. 3,293,799: Keller et al.
U.S. Pat. No. 3,438,575: Rohling
U.S. Pat. No. 3,512,712: Benesch
U.S. Pat. No. 3,892,982: Holmes
U.S. Pat. No. 4,937,972: Freitus An article that appeared in Sunset magazine points out that double compartment containers of the type described above have major drawbacks. One of those is the lack of control of the amount of moisture around the root ball of the plant in the growth compartment: the root ball becomes saturated with water and damage to the plant results. Another drawback is the growth of roots close to, and into the wick or the porous wall. As a result the flow of water to the plant is gradually reduced, requiring periodical removal of the plant for root trimming. The article also points out the availability of an improved variation on the dual compartment systems: an additional moisture sensor. The same type of sensor is also described by Rohling. In this type of system the compartment that contains the solution is made fully enclosed. Inflow of air to the portion of it above the solution level is allowed through a flexible tube. This tube is connected on its opposite end to a moisture sensor which is inserted into the growth medium. As long as the sensor is moist it shuts off the flow of air into the solution compartment thereby shutting off the flow of solution into the growth compartment. When the moisture level in the growth medium falls, the sensor drys up and allows air to enter the compartment which contains the solution and in turn allows solution to flow into the growth compartment. The solution then spreads throughout the growth medium eventually reaches and moistens the sensor which shuts off the flow. Positioning the sensor at different locations within the growth medium relative to the location at which solution enters the growth compartment allows control of the amount of solution delivered to the growth medium.

Freitus describes a self contained plant growth system comprised of separate compartments for the growth medium and the feeding solution. Solution is pumped out of the solution compartment by an electrically powered pump and delivered to the growth medium. A moisture detector is inserted in the growth medium and communicates with the pump electrical circuit. When the moisture level in the growth medium falls below a preset level the sensor sends a signal to activate the pump. Consequently, solution enters the growth medium via a supply tube that extends from the pump towards a location above the growth medium. Solution falls freely from the opening of the tube down to the growth medium below at some distance from the location where the sensor is inserted. The solution is being absorbed by the growth medium. The resulted increase in moisture is then detected by the moisture sensor which in turn sends a signal to stop the pump. Adjusting the amount of solution delivered to the growth compartment in the Rohling and in the Freitus systems is difficult because it involves a trial and error effort to establish the proper location of the sensor.

For the automatic feeding of plants that are planted in common containers, i.e. containers with a single compartment that supports the plant and its growth medium, add-on provisions were devised. One provision is to supply water from the regular water supply line via a timer operated valve. Alternatively, the valve can be connected to an elevated container which contains water or fertilizer solution thus making use of the gravitational force. The timer is programmed to open the valve periodically and for a preset duration. The selection of proper timer settings for optimal feeding is difficult. With this method over-feeding or under-feeding are likely and damage to the plant results. Provisions which make use of a constant flow of water are also in use: plant containers are placed on an absorptive mat which is kept soaked by the constant feed of water. Excess of water is allowed to drain off. Water enters the containers via holes on the bottom. In this method over-feeding and a resulting damage to plants is very likely. As was made clear in the prior discussion, solution flow controlled by a moisture sensing device is essential for reliable operation.

Keller et al. suggest a system that exploit the difference is gross weight of the container and its contents between the properly moistened condition and the dryer, yet sufficiently moist condition, for determining moisture level. The plant container is placed on a platform which is a part of a weight sensing mechanism. A valve which is mechanically controlled by this mechanism opens the supply of solution to the container when its weight drops below a presettable level and shuts it off when the container weight reaches a higher presettable level. The main drawback of this method stems from the fact that most plants gain in weight at a significant rate. Consequently, the amount of feed is gradually reduced and proper moisture cannot be maintained. Another drawback of these systems is their limited ability to accommodate containers of arbitrary size and weight. Also their complexity and cost precludes them from wide use.

Benesch suggests a system which include a moisture sensor for flow control that exploits the property of wood to expand when moist and contract when dry. This expansion and contraction is used to activate a valve that controls the flow of water or feeding solution to the growth medium. This system shares the same disadvantage as those suggested by Rohling and by Freitus because the amount of solution delivered depends on the time it takes for the moisture to spread and wet the sensor element thus making it difficult to set up.

Dodge, Higgins and Holmes separately suggest systems that exploit the change in the electrical resistance between a set of two conductive electrodes embedded in the growth medium for sensing the moisture level of that medium. Since determination of the resistance requires flow of electric current through the growth medium, the current must be low enough as to prevent excessive chemical decomposition within the growth medium due to electrolysis. And since the changes of this current are used to control an electrically actuated flow valve, current amplification is required. Dodge uses electromechanical relays as amplifiers. Higgins and Holmes use electronic valves in combination with electromechanical relays. In addition, Holmes added a controllable timer which in response to a signal from the moisture sensing circuit opens the flow of feeding solution to the growth medium and shuts it off after a preselected time. This facilitates the prevention of over-feeding.

The main objective of the invention is to provide an inexpensive add-on provision for the automatic feeding of potted plants that are normally being fed manually. In particular this invention will be of help to those who plan to be absent from their home or office for many months and wish to provide continuous and cost effective care for their house or office plants during their absence.

In light of the prior discussion of prior art the following specific goals of the invention should now be clear:
a. To deliver water or plant nutrient solution out of an arbitrary container selected and provided by the user.
b. To initiate feeding only when the moisture level in the growth medium falls bellow a predetermined level.
c. To deliver a controllable amount of plant nutrient solution at each feeding cycle.
d. To be self powered and portable.
e. To be of a ready to use integral construction thus avoiding the need by the user to assemble mechanical parts or to connect electric wires.
f. To provide a cost effective feeding for even the least expensive potted plant.

The above objectives are achieved by constructing an apparatus consisting of a motor-driven pump, a flexible tube for the delivery of solution from the pump to the plant container, a stake assembly to facilitate anchoring of the tube and a set of two moisture sensing electrodes to the growth medium, and electric battery which supplies power to the motor via an electronic switching circuit which responds to the signal from the moisture sensing electrodes. The user selects a container, fills it with water or nutrient solution and places it next to the potted plant. Then he inserts the stake assembly into the growth medium and inserts the pump into the container. The operation of the apparatus starts automatically thereafter.

DESCRIPTION OF THE PREFERRED EMBODIMENT

Figure 1:
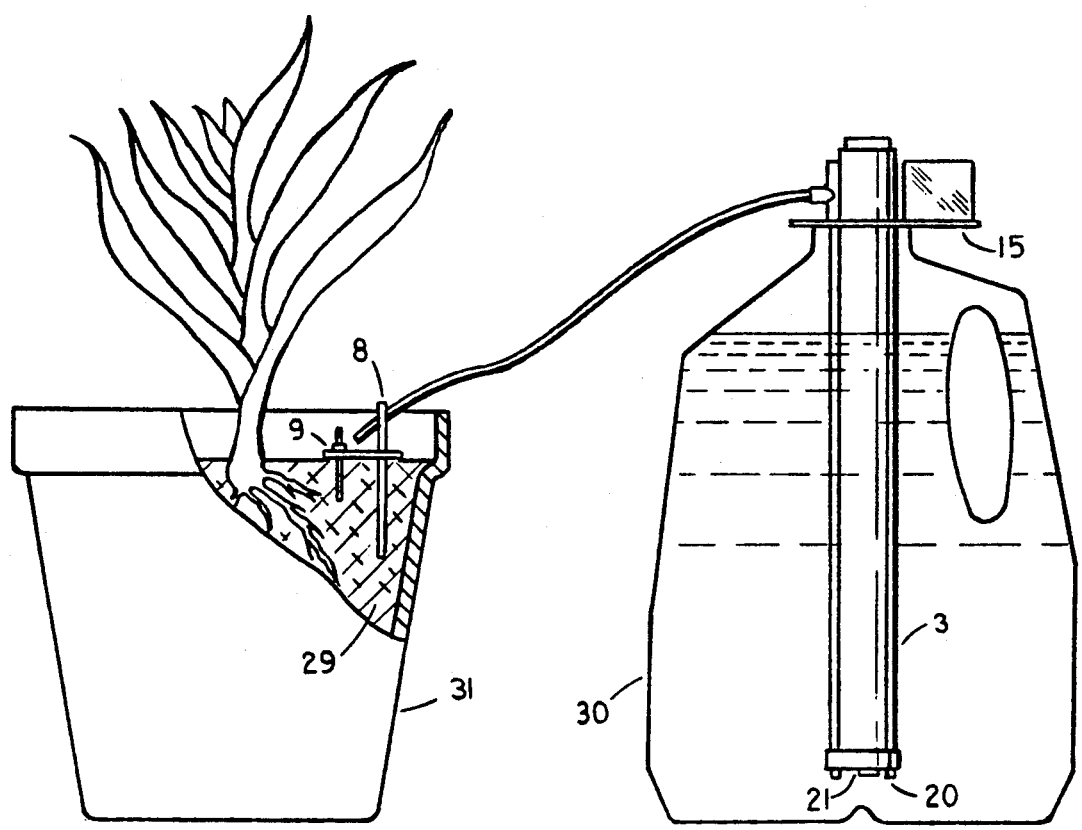

The following drawings illustrate the preferred embodiment or parts thereof:

FIG. 1—Illustrates the proposed way of incorporating the apparatus, the potted plant and the nutrient container.

Figure 2:
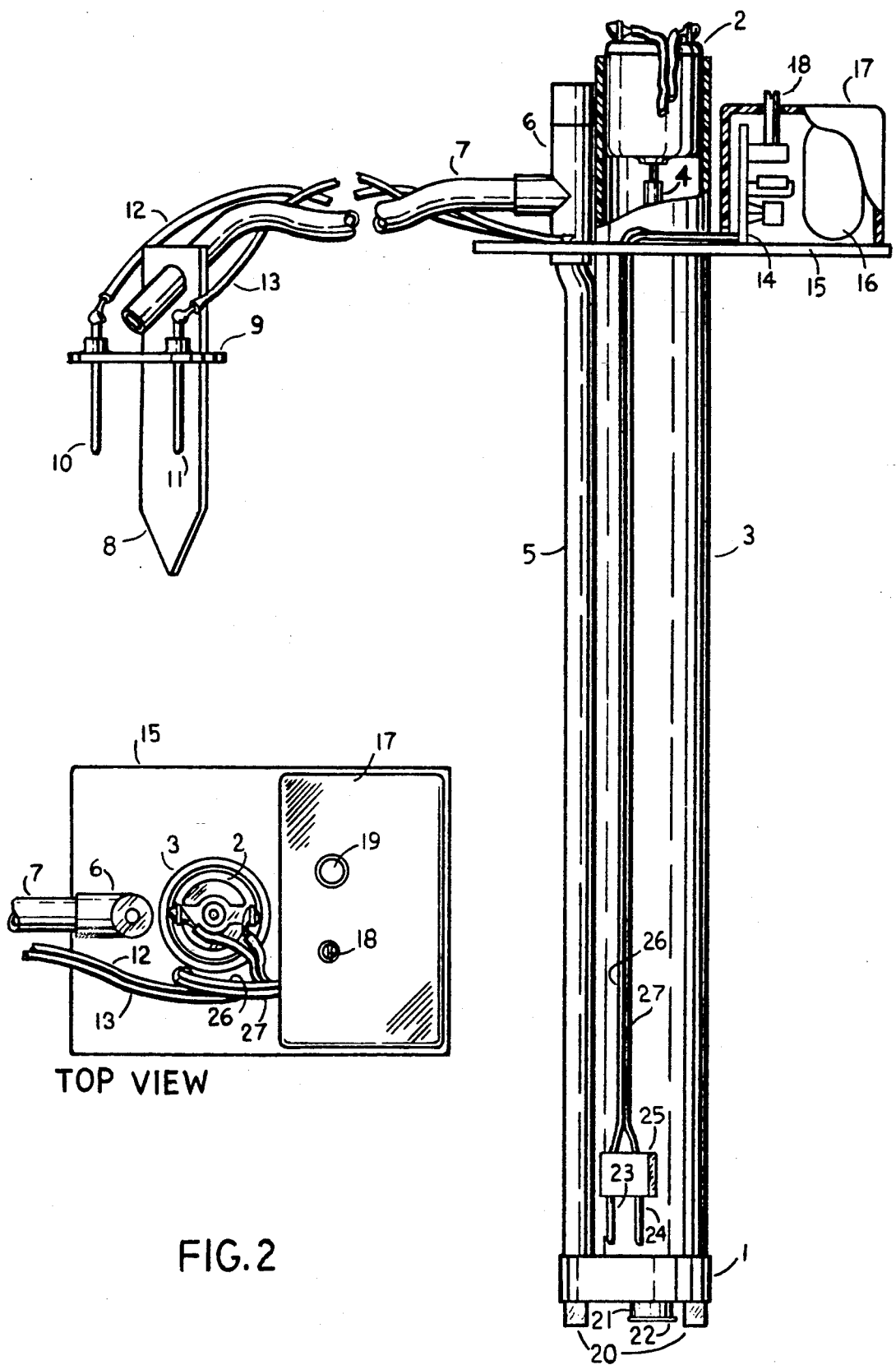

FIG. 2—Illustrates the general construction and the main components.

FIG. 2A—Illustrates a top view of the support plate with the electric motor and circuit components attached.

Figure 3:
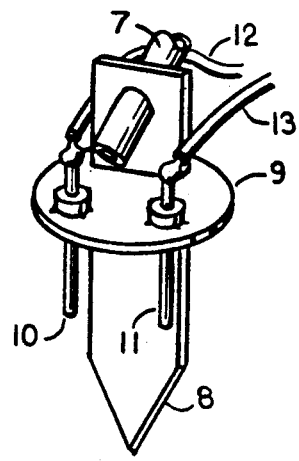

FIG. 3—Isometric view of the moisture-sensing electrode assembly.

Figure 4:
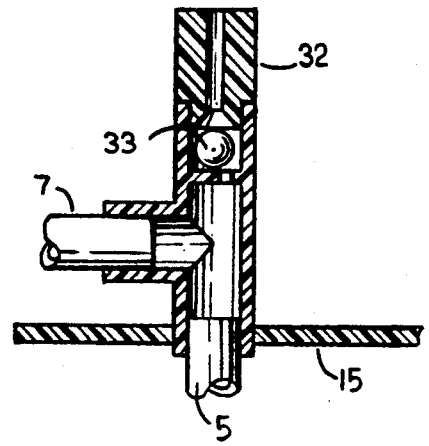

FIG. 4—Details the anti-siphon valve construction.

Figure 5:
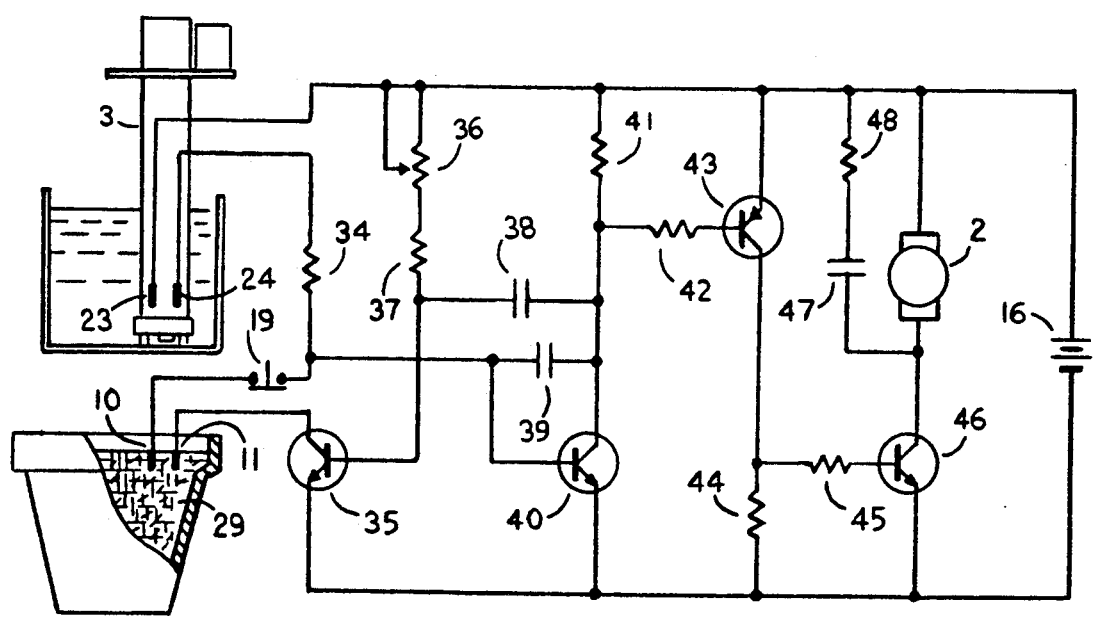

FIG. 5—Shows the schematic diagram of the electronic control circuit.

With reference to FIG. 2, centrifugal pump 1 is attached to the lower end of tubular column 3. Electric motor 2 is attached to the upper end of column 3. Pump 1 is coupled to motor 2 with a round shaft 4. Pump inlet port 21 is covered by a filter mesh 22 which stops large solid particles from entering the pump. Conduit 5, attached alongside column 3, is connected on its lower end to the outlet port of pump 1 and on its upper end it is connected to the inlet port of anti-siphon valve 6. The outlet port of anti-siphon valve 6 is connected to a flexible tube 7. The other end of tube 7 is attached to stake 8 at an angle of approximately 45 degrees downwards. A stopper plate 9, made of insulating plastic material is attached at a right angle to stake 8 at a point approximately ⅔ of its length from the lower end. Stopper plate 9 supports two non corrosive electrodes 10 and 11. Electrodes 10 and 11 which are approximately 2.5 millimeter thick, protrude approximately 2 centimeter from the lower face of plate 9 and are approximately 2 centimeter apart. The upper tips of electrodes 10 and 11 are soldered to flexible and insulated electrical wires 12 and 13 respectively. Wires 12 and 13 run alongside tube 7 and connect to electronic circuit 14. Electronic circuit 14 and battery 16 are mounted on top of support plate 15 and under a protective cover 17. Support plate 15 is attached to column 3. Electronic circuit 14 includes a potentiometer whose shaft 18 protrudes through a hole in cover 17. It also includes a pushbutton switch 19 whose button also protrudes through cover 17. A second set of electrodes, 23 and 24 are supported by insulating spacer 25 which is attached to the lower end of column 3. Electrodes 23 and 24 are made identically to electrodes 10 and 11 and are spaced approximately 1 centimeter apart. Two insulated electrical wires 26 and 27 run alongside column 3 and connect electrodes 23 and 24 respectively, to electronic circuit 14.

With reference to FIG. 1, FIG. 2 and FIG. 5 the detailed operation of the apparatus will now be explained. As depicted in FIG. 1 stake 8 is pushed into the growth medium 29 until the stopper plate 9 rests on top of that medium. Column 3 is inserted into solution container 30 until support plate 15 comes to rest on the opening rim of container 30, or, in case of a smaller container, the apparatus will reach to the container bottom. In the latter case prongs 20 provide support and prevent blockage of inlet port 21. With reference to FIG. 5, when column 3 is immersed in the feeding solution the electrical resistance between electrodes 23 and 24 falls to about 1 kilo ohm. If the growth medium 29 is adequately moist the resistance between electrodes 10 and 11 is less than 100 kilo ohm. Consequently, collector current is established in transistor 35. Resistor 34 is selected so that the voltage between the base and the emitter of transistor 40 is lower than its turn-on voltage threshold. Under the moist condition, transistor 35 is in saturation and transistor 40 is in cutoff. Transistors 35 and 40 together with resistors 34, 36, 37 and 41 and capacitors 38 and 39 form a monostable flip-flop circuit. As the moisture in the growth medium 29 is reduced, the resistance between electrodes 10 and 11 increases, causing the base emitter voltage of transistor 40 to increase and cross the threshold level at which a rapid transition of states occurs: transistor 35 is turned off and transistor 40 is turned on. Consequently current flows through resistor 42. This current is amplified by the current booster circuit consisting of transistors 43, 46 and resistors 44 and 45. Motor 2 will then run for a duration set by the flip-flop time elements: capacitors 38, 39 and resistors 34, 36 and 37. Resistor 48 and capacitor 47 prevent high voltage spikes across transistor 46. Resistor 36 is the potentiometer whose shaft 18 is accessible to the user for the purpose of controlling the duration of the pumping, hence the amount of solution delivered to growth medium 29 each feeding cycle. The delivered solution immediately moistens the medium between electrodes 10 and 11. This guarantees that after the pumping stops the voltage between the base and the emitter of transistor 40 is below the threshold level and the flip-flop will continue to stay in its normal stable state until the next pumping cycle. Momentary-disconnect switch 19, connected in series with electrode 10 allows the user to test the apparatus. If the switch is pushed, a feed cycle starts regardless of the moisture content in the growth medium 29. Electrodes 23 and 24 provide an arrangement for preventing the operation of the apparatus when the quantity of feeding solution is exhausted. When the solution level falls bellow the lower tips of electrodes 23 and 24, no current is possible through transistor 40 and hence no current is possible in transistors 43 and 46. Anti-siphon valve 6 is necessary when the solution level in container 30 is higher then the level of growth medium 29. With reference to FIG. 4, as solution enters valve 6 from conduit 5 it raises ball 33 which covers the hole in plug 32. When the pumping stops, the ball 33 falls, allowing air into valve 6 through the hole in plug 32. Consequently the siphon path breaks: the remaining solution in tube 7 flows into the plant container 31 and the remaining solution in conduit 5 returns to container 30.

SUMMARY AND RAMIFICATIONS

An apparatus for the automatic feeding of container plants was described. Although the apparatus is described as an assembly of many distinct parts, some of those parts can be molded as one integral piece of plastic material. For example, the housing of pump 1, column 3, conduit 5, the housing of valve 6 and support plate 15 can be made as one integral piece. Pump 1 is described as a centrifugal pump, however it can be of any other suitable type such as: a gear pump, a piston pump or a diaphragm pump. An alternative embodiment in which a piston pump or a diaphragm pump is installed next to the motor 2 on top of support plat 15 eliminates the need for column 3, leaving only conduit 5 to run from the pump to the bottom of solution container 30. Those who are proficient in the art of electronic design can appreciate that the only current drain from the battery during the time between pumping operations consists of the base and collector currents of transistor 35 and that by proper selection of component values the current drain can be less than 10 micro amper. With a proper selection of motor 2 the apparatus can be designed to operate on a single, C-size, 1.5 volt alkaline battery for a duration in excess of one year. Potentiometer 36 and resistor 37 define the control range of the amount of solution delivered each pumping cycle. A suitable range is between 50 cc for the smallest plant container to 250 cc for the largest container. An embodiment using a selector switch and a set of fixed resistors to replace potentiometer 36, is also practical.

What is claimed as a new invention is:

1. An add-on apparatus for automatically feeding plants in a plant container filled with growing medium, with liquid nutrient from a nutrient container, said apparatus comprising: an electric motor coupled to a pump by an elongated drive shaft, said pump and drive shaft adapted for immersion in a nutrient container with said motor adapted to be mounted on said container above the nutrient level of said container, a flexible tube coupled to said pump and adapted to extend from said pump to a plant container provided at a location remote from said nutrient container, said flexible tube including an anti-siphon valve adapted to be positioned above the nutrient level of said nutrient container, an electronic control circuit, said circuit including a first sensor adapted to be at least partially buried in said growing medium and capable of generating a signal indicative of the need for feeding, said circuit capable of activating said pump for a predetermined time period responsive to a signal from said first sensor, said time period being adjustable for different sized plant containers by an adjustment means in said electronic control circuit.

2. An apparatus as in claim 1 and further comprising a second sensor provided adjacent said pump and capable of detecting whether the pump is emersed above liquid level and producing a signal responsive to the condition of said pump, the operation of said pump being disabled by the signal produced by said second sensor means.

* * * * *